July 26, 1949.    S. H. LANCHNER    2,477,187
CUSHIONING OR SHOCK-ABSORBING MEANS
Filed Feb. 28, 1944
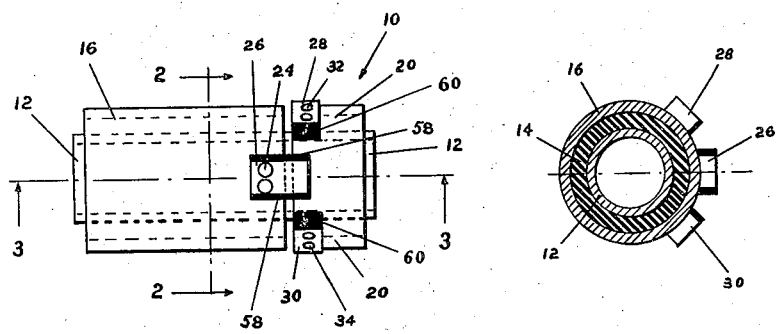
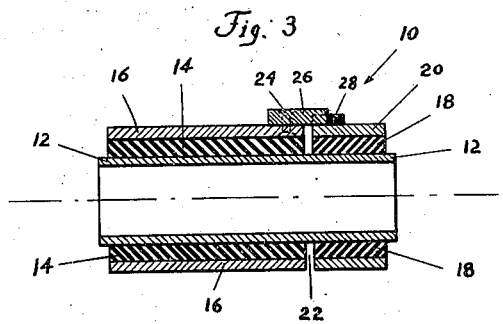
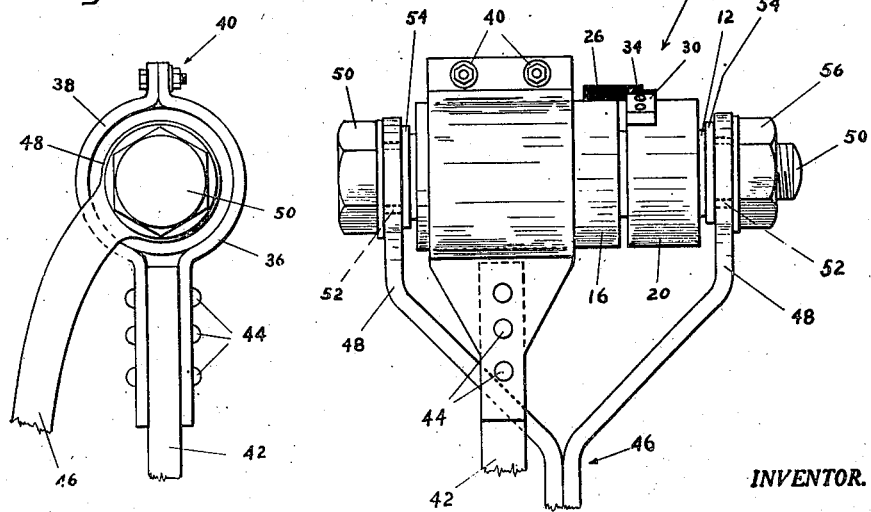
INVENTOR.
SAMUEL H. LANCHNER
BY
ATTORNEYS.

Patented July 26, 1949

2,477,187

UNITED STATES PATENT OFFICE 2,477,187

CUSHIONING OR SHOCK-ABSORBING MEANS

Samuel H. Lanchner, New York, N. Y.

Application February 28, 1944, Serial No. 524,174

9 Claims. (Cl. 267—21)

The present invention relates to a torsional cushioning or shock absorbing means that is positioned between two separated parts that may be moved relatively one to the other under a sudden impact to which one or both may be subjected, for example, the axle and frame of an automobile or the like.

This invention is an improvement to the vehicle cushioning or shock absorbing device such as is the subject of Patent No. 1,710,809 granted to William C. Broadwell.

While the device of that patent is designed to absorb and cushion a vehicle, to which it is attached, from the shock or impact to which it may be subjected when an axle of the vehicle is suddenly moved toward the frame as a wheel passes over an obstruction in its path, I have found that such device does not fully and evenly absorb the shock of the impact.

The present invention therefore contemplates the construction of a torsional cushioning and shock absorbing device that uniformly, evenly and in an improved manner absorbs and cushions the force of impact that may be transmitted between two comparatively freely suspended parts, which move relatively to one another under the impact.

The device of my invention is resistant to wear and has a comparatively longer life because it is designed to absorb the force of impact evenly and not suddenly with great rapidity.

These, other and further objects and advantages of the present invention will become clear from the following description and the drawing appended thereto in which Fig. 1 is a plan view of a torsional cushioning and shock absorbing means according to my invention;

Fig. 2 is a section on the line 2—2 of Fig. 1;

Fig. 3 is a section on the line 3—3 of Fig. 1;

Fig. 4 is a fragmentary end view of a device according to my invention, arranged for connection between two relatively moving parts;

Fig. 5 is a fragmentary plan view thereof.

Referring now to the drawing, a cushioning or shock absorbing means according to the present invention, generally indicated by the reference character 10 (see Fig. 1), comprises the inner element or hub 12, which may be cylindrical tube or rod, to the outer peripheral surface of which, at one end thereof, there is vulcanized, or otherwise suitably connected or anchored an annular ring 14 of resilient material, such as rubber or the like.

The outer peripheral surface of this resilient, annular ring 14, positioned at one end of the cushioning or shock absorbing means 10, is likewise vulcanized or otherwise connected or anchored to the inner surface of an embracing member 16, also preferably formed from a cylindrical tube.

At the other end of my novel means 10, I vulcanize or otherwise secure to the inner element 12, a second resilient annular ring 18, spaced from the ring 14, to which there is also vulcanized or otherwise connected or anchored a second embracing member 20, also preferably formed from a cylindrical tube.

For reasons that will become apparent, the resilient ring 14 and its embracing member 16 is preferably of somewhat greater length than the resilient ring 18 and its embracing member 20 and are spaced therefrom by the annular slot 22, the width of which is relatively short, for example, approximately $\frac{3}{32}$ to ¼ of an inch.

Secured to the relatively longer embracing member 16, as by the rivets 24 or suitably welded thereto, I provide a secondary shock absorbing means, in the finger 26, which extends over the relatively shorter member 20 between the lugs or stop members 28 and 30, secured to the embracing member 20 also as by the rivets 32 and 34 or suitably welded thereto.

The cushioning or shock absorbing means 10, thus far described, may be adapted by any suitable mechanism for connection to two parts that move relatively one to the other so that any shock to which they are subjected may be cushioned or absorbed by the means 10; for example, such means may be employed in connection with each wheel and the frame of an automobile or the like.

An example of a suitable connecting mechanism, is the more or less resilient and contractile member, the two corresponding parts 36 and 38 of which clamp or embrace the relatively longer member 16 so that they move together. The two clamping parts 36 and 38 are connected at one end together about the embracing member 16 by means of the nut and bolt assembly 40 and are secured at the other end to a lever 42, as by means of the rivets 44.

I secure to the hub or inner member 12 the yoke 46, also to move together, the arms 48 of which embrace the cushioning or shock absorbing means 10, at the ends thereof.

To secure the yoke member 46, for example, there may be provided in the interior of the hub 12 a securing bolt 50 the threaded ends of which extend from the hub and pass through suitable eyes 52 in each arm 48. In order to clamp the arms 48 against the ends of the hub 12, from which they are spaced by the washers 54, I provide on each threaded end of the bolt the nuts 56 to lock the yoke thereto so that it will move with the hub 12, the connecting mechanism (36 and 38) likewise moving with the embracing member 16.

In operation therefore the yoke member 46 is connected to one movable part, for example the chassis or frame of an automobile, and the lever 42 connected to the other relatively movable part, which in the case of a vehicle and the like will then be the wheel axle. Since the wheel is subjected directly to the road impact and therefore the greatest force may be imposed thereon to cause it to move the greater distance, I prefer to connect the wheel axle to the outer embracing member. It will, of course, be understood this arrangement may be reversed, if so desired.

For example, it will be apparent that as a wheel of a vehicle passes over an obstruction one end of the axle is raised, the lever 42 which is connected to the axle, will likewise be raised to cause corresponding rotation of the embracing member 16 with resulting twisting of the ring 14.

The resilient ring 14 will tend to torsionally resist the corresponding rotation of the embracing part 16 thus caused by raising the lever 42, under the impact of the obstruction, the yoke 46 and the hub 12 remaining comparatively stationary.

However, if for any reason, the yoke 46 is moved, the motion thereof and corresponding rotation of the hub 12 will be opposed to that of the member 16 and lever 42.

In order to restrain the comparatively sudden (violent) resistance to impact incurred thereby, I have provided the finger 26, which since it is secured to the embracing part 16, is moved with it toward the stop member 28 and against it. As the finger 26 engages the stop 28, it also will tend to be moved in the rotative direction assumed by the member 16. This thereby brings into play the torsional resistance of the second ring 18 which opposes the corresponding movement of the member 20, to thus smooth out and make less sudden (violent) and more uniform and even the cushioning effect of the shock absorbing means 10.

As the arm 42 rebounds in the opposite direction, when the wheel is released by the road obstruction, the resilient ring 14 is oppositely twisted and then tends to torsionally resist this motion and absorb the shock imposed thereby.

At the same time the finger 26 is moved toward and into engagement with the other stop member 30 to force it to move in the same direction, the ring 18 torsionally resisting this rebound movement or rotation of the embracing part 20 to again smooth out the shock imposed by the release from the obstruction.

It will now be recognized that the finger and stops and the additional resilient ring tend to reduce and smooth out the time rate of absorption of the force of the impact, to which the two relatively moving parts have been subjected, thereby providing a superior cushioning and shock absorbing means.

In order to eliminate any noise that may occur by the impact of the finger 26 against either of the stops 28 and 30, I preferably cushion them by arranging on the adjacent engaging sides thereof the resilient, preferably rubber, pad like members 58 and 60.

If desired, the resilient annular ring 14 may be made from a material that is more elastic than the material from which the other resilient annular ring 18 is made. This difference in the elastic or resilient properties of the two rings permits one of the rings to even further supplement the cushioning or shock absorbing effect of the other ring. It will, of course, be understood that the annular ring 18, if desired may be made from more elastic material than that from which the ring 14 is made.

While I have described my invention in certain details, and have as an illustration of the use thereof described its application to an automobile, I do not intend to be limited thereto, since many other combinations and modifications will be apparent to those skilled in the art.

I claim:

1. In a cushioning or shock absorbing means, a hub, a resilient ring secured to the outer surface of the hub at one end thereof, a member enclosing the resilient ring and secured thereto, a second resilient ring secured to the outer surface of the hub at the other end thereof, a second member enclosing the second resilient ring and secured thereto, a pair of spaced stop members on the outer surface of the second enclosing member and a finger on the outer surface of the first enclosing member and extending therefrom above the second enclosing member between the two stop members.

2. The cushioning and shock absorbing means of claim 1, the first mentioned ring and enclosing member spaced from the second mentioned ring and enclosing member.

3. The cushioning or shock absorbing means of claim 1, one of said rings and enclosing members being of greater length than the other of said rings and enclosing members.

4. The cushioning or shock absorbing means of claim 1, the adjacent sides of the stop members and the finger having a cushioning material secured thereon.

5. In a cushioning or shock absorbing means, an inner member, a resilient means secured to said inner member at one end thereof, an element embracing the said resilient means, a second resilient means, secured to said inner member at the other end thereof, a second element embracing the second resilient means, a member on one of said elements and means on the other of said elements normally spaced from said member and engaged thereby to form a lost motion connection between the resilient means upon deforming one of said resilient means under a strain imposed thereon.

6. The cushioning or shock absorbing means of claim 5, one of said resilient means and embracing elements of greater length than the other of said resilient means and embracing elements.

7. In a cushioning or shock absorbing means, a shaft, a resilient torsion ring secured thereon, a second resilient torsion ring secured to the shaft, each of said resilient torsion rings deformable upon subjecting it to a strain, an element secured to each of said resilient torsion rings, means on one of said elements and second means on the other of said elements normally spaced therefrom, the said first means for engagement with the said second means upon deforming a said resilient torsion ring under a strain imposed thereon to form a lost motion connection between the resilient torsion rings.

8. The cushioning or shock absorbing means of claim 7, one of said resilient torsion rings being larger than the other.

9. In a cushioning device for two parts movable relatively one to the other, an inner member to be secured to one of the parts, a resilient ring secured to the outer surface thereof at one end of the inner member, a second resilient ring spaced from the first ring and secured to the outer surface of said inner member at the other end thereof, an element on one of the resilient rings to be secured to the other of said parts, a second element on the other of said resilient means, said resilient means deformable upon movement of one of said parts relatively to the other part, means on one end of said elements for engagement with means on the other of said elements to form a lost motion connection between the resilient rings upon deforming a said resilient ring under movement of one part relatively to the other part, said second means normally spaced from said first means.

SAMUEL H. LANCHNER.

REFERENCES CITED

The following references are of record in the file of this patent:

UNITED STATES PATENTS

| Number | Name | Date |
| --- | --- | --- |
| 2,069,270 | Piron | Feb. 2, 1937 |
| 2,092,613 | Olley | Sept. 7, 1937 |
| 2,173,652 | Lee et al. | Sept. 19, 1939 |
| 2,246,848 | Hicks | June 24, 1941 |
| 2,270,571 | Woolson et al. | Jan. 20, 1942 |
| 2,270,572 | Woolson et al. | Jan. 20, 1942 |
| 2,409,501 | Krotz | Oct. 15, 1946 |